(12) United States Patent
Burr et al.

(10) Patent No.: US 9,936,719 B2
(45) Date of Patent: Apr. 10, 2018

(54) SEMI-SOLID ANIMAL FEED BLOCKS AND METHOD OF MAKING AND USING SAME

(71) Applicant: LAND O'LAKES PURINA FEED LLC, Shoreview, MN (US)

(72) Inventors: Michael S. Burr, Marthasville, MO (US); Brenda de Rodas, O'Fallon, MO (US)

(73) Assignee: PURINA ANIMAL NUTRITION LLC, Shoreview, MN (US)

( * ) Notice: Subject to any disclaimer, the term of this patent is extended or adjusted under 35 U.S.C. 154(b) by 989 days.

(21) Appl. No.: 13/622,658

(22) Filed: Sep. 19, 2012

(65) Prior Publication Data

US 2014/0079843 A1 Mar. 20, 2014

(51) Int. Cl.
A23K 1/00 (2006.01)
A23K 1/18 (2006.01)
A23K 40/20 (2016.01)
A23K 20/147 (2016.01)
A23K 20/163 (2016.01)
A23K 50/10 (2016.01)
A23K 50/30 (2016.01)
A23K 50/60 (2016.01)

(52) U.S. Cl.
CPC .......... *A23K 1/1893* (2013.01); *A23K 20/147* (2016.05); *A23K 20/163* (2016.05); *A23K 40/20* (2016.05); *A23K 50/10* (2016.05); *A23K 50/30* (2016.05); *A23K 50/60* (2016.05)

(58) Field of Classification Search
CPC .... A23K 1/1893; A23K 1/184; A23K 1/1643; A23K 1/1813; A23K 1/1631; A23K 20/147; A23K 20/163; A23K 40/20; A23K 50/10; A23K 50/30; A23K 50/60
See application file for complete search history.

(56) References Cited

U.S. PATENT DOCUMENTS

| | | | | |
|---|---|---|---|---|
| 2,924,522 | A * | 2/1960 | Gehrt | A23K 1/003 426/649 |
| 6,106,881 | A * | 8/2000 | Yajima et al. | 426/549 |
| 2005/0048163 | A1 * | 3/2005 | Freeman | A23K 40/20 426/2 |
| 2005/0186305 | A1 * | 8/2005 | Rosenberg | A23K 1/005 426/2 |
| 2005/0271788 | A1 * | 12/2005 | Lanter | A23K 1/1643 426/573 |

* cited by examiner

*Primary Examiner* — Chhaya Sayala
(74) *Attorney, Agent, or Firm* — Dorsey & Whitney LLP

(57) ABSTRACT

A semi-solid animal feed block is provided to an animal as a feed supplement or as a complete feed. The feed block is formed of a liquid binder containing denatured wheat flour protein and sugar, and a nutrient mixture of at least one animal feed component. The denatured protein and the sugar bind the nutrient mixture to form the semi-solid animal feed block as a single mass. The nutrients may be formulated to promote digestive tract development of a recently weaned livestock animal, such as a piglet.

7 Claims, 2 Drawing Sheets

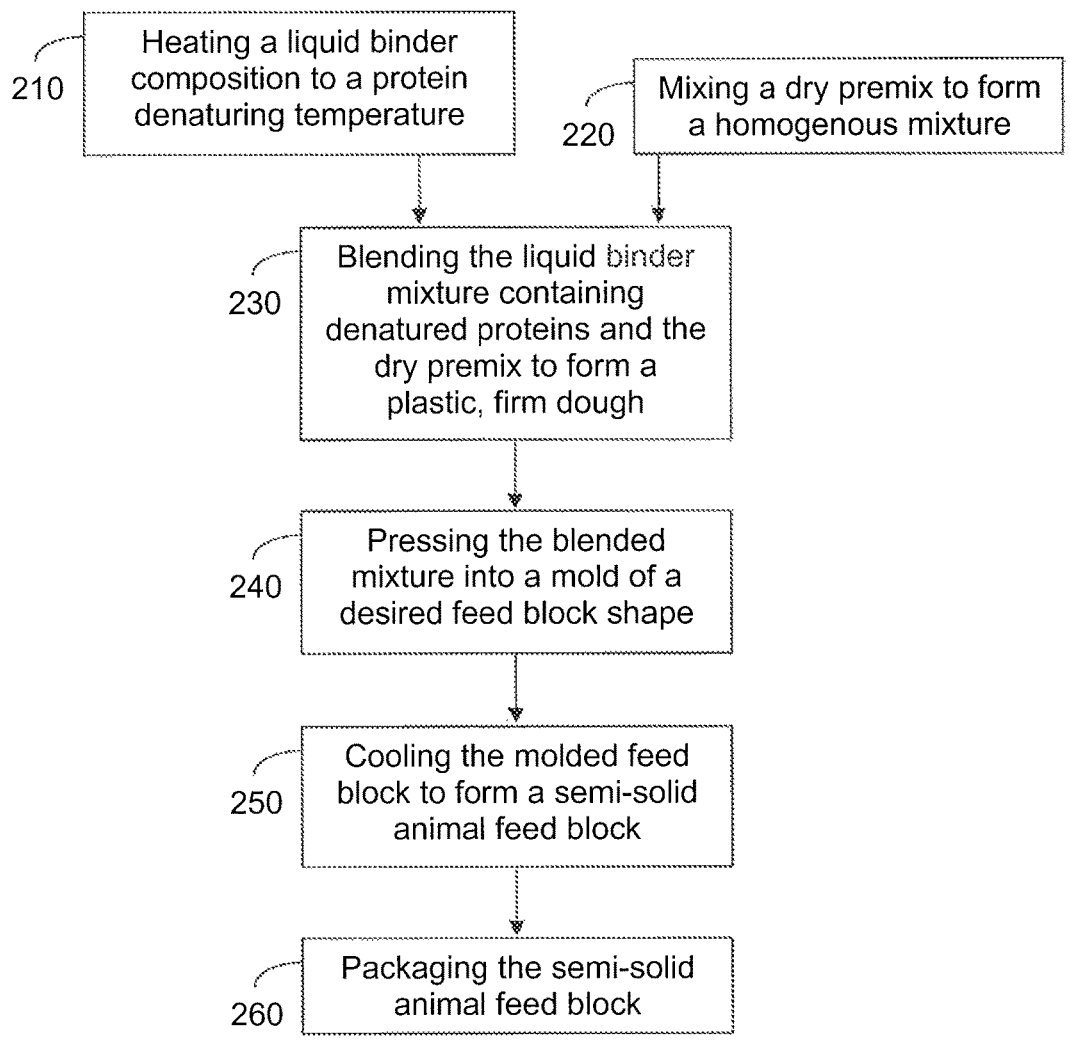

SEMI-SOLID ANIMAL FEED BLOCKS AND METHOD OF MAKING AND USING SAME

FIELD OF THE INVENTION

The present disclosure relates to semi-solid animal feed blocks and methods of making and using the semi-solid animal feed blocks. More particularly, the disclosure relates to semi-solid animal feed blocks with a low moisture and high dry matter content that may be provided to animals in a single, easy-to-handle mass.

BACKGROUND

Feeding the young animals prior to weaning or during weaning, such as pigs while with the sow, or after the animal is recently weaned, is generally through delivering meal feeds, pellets, crumbles, milk replacers, wetted meals forming a paste, or gel feeds. In these prior approaches, the feeds do not provide nutrients in a form that can be fed in a single mass that is consumed over a period of time making the feeds difficult to handle. Also, some of these products are not readily consumed by the young pigs. For example, pellets may be difficult to consume due to their hard texture by the young animals. Gel or paste feeds may adhere to an animal's face and may add difficulties to cleaning pens where the animal is confined resulting in animal welfare issues. In addition, for wetted meal feeds or gel feeds sold to producers, moisture accounts for a large percentage of the weight of the feed, which makes purchasing such hydrated feeds unattractive due to the perception that the producer is paying for water. Further, where the producer adds water to hydrate meal feeds or gel feeds, the amount of liquid used may vary and may result in feed inconsistencies, which may result in the feed being unpalatable for animals. Feed waste is also greater with meal diets. While pigs may prefer high moisture diets (e.g. milk, gel) compared to dried diets during the pre-weaning and right after weaning periods, when not fed properly, the high moisture diets may cause difficulties in transitioning the animals to dry feed. Therefore, producers would benefit from additional animal feed products that ease the transition from sow's milk to dry feed, provide improved handling and reduce cost.

Further, with respect to young pigs, weaning presents many challenges to the animal, such as an abrupt change from a liquid to a solid diet and a new social structure. Combined, these effects disrupt feed and water intake (Dybkjaer et al., 2006; Varley and Stockill, 2001). These disruptions are associated with a lag in growth performance and an increase in morbidity and mortality in the nursery (Maxwell and Carter, 2001). Complex diets containing plasma protein, milk products, and other high quality ingredients have been used with some success to minimize this post-weaning lag (Maxwell and Carter, 2001). The physical form of the diet during the immediate post-weaning period has a large impact on voluntary feed intake.

SUMMARY

In view of the foregoing, provided herein are methods of making semi-solid animal feed blocks having a relatively high dry matter content and a low moisture content that avoid the drawbacks of the prior approaches to feeding animals. The feed blocks may be used to supplement the feed or replace the feed of animals to promote consumption of solid feed. For example, animals that may benefit from ingesting the semi-solid animal feed blocks may include pre-weaning and recently weaned animals, animals in distress such as an animal with dehydration or scours or animals that are near calving such as cows in calving pens.

According to one implementation, a method of making a semi-solid animal feed block involves providing a liquid binder composition comprising water, wheat flour and sugar and heating the liquid binder composition to a protein denaturing temperature. The liquid binder composition with the denatured flour protein is combined with a nutrient mixture containing animal feed components and heated to form a plastic dough mixture. The plastic dough is molded into a block shape, and is cooled such that the denatured proteins and the sugar bind the nutrient mixture to form the animal feed supplement as a semi-solid animal feed block.

In another implementation, a method of feeding of a recently weaned animal involves obtaining a semi-solid animal feed block formed of a binder composition and a nutrient mixture. The binder composition is formed of denatured wheat flour protein and sugar, and the nutrient mixture comprising at least one animal feed component. The denatured protein and the sugar bind the nutrient mixture to form the semi-solid animal feed block as a single mass with between about 14 and about 17 weight percent moisture and weighing between about 2 and about 4 pounds. The semi-solid animal feed block is fed to the recently weaned animal for up to 14 days.

In yet another implementation, a semi-solid animal feed block formed of a liquid binder composition includes denatured wheat flour protein and sugar, and a nutrient mixture contains at least one animal feed component. The denatured wheat flour protein and sugar bind the nutrient mixture to form the semi-solid animal feed block as a single mass. The semi-solid animal feed block includes between about 12 and about 17 weight percent moisture and weighs between about 2 and about 4 pounds.

BRIEF DESCRIPTION OF THE DRAWINGS

FIG. 2 illustrates a method of producing a semi-solid animal feed block according to the present disclosure.

DETAILED DESCRIPTION

Semi-solid animal feed blocks and methods of making and using the semi-solid animal feed blocks are provided herein. The feed blocks may be used to supplement the feed of an animal or may be used as a complete feed. As used herein, animals may include livestock and companion animals. By livestock is meant agricultural or farm animals such as swine, piglets, horses, foals, cattle, calves, sheep, lambs, goats and kids raised in a farm, ranch or agricultural setting or animals kept in zoos or zoological settings. By companion animals is meant dogs, cats and rabbits raised in the home.

Figure 1A:
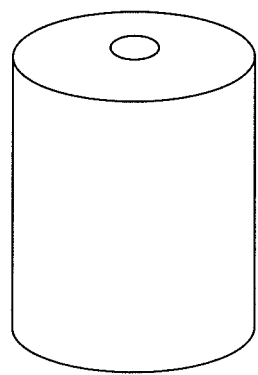
FIGS. 1A and 1B illustrate semi-solid animal feed block products according to the present disclosure.
Figure 1B:
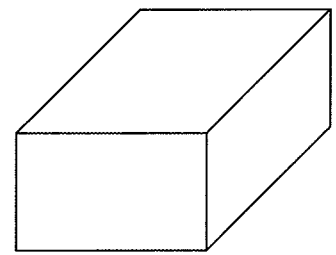

Semi-Solid Animal Feed Blocks:

Semi-solid animal feed blocks may be provided as individual masses of feed bound together to take the form of a block with a cylindrical shape (FIG. 1A), with a brick-like shape (FIG. 1B) or with another shape suitable for delivering to the animal as a single mass. The blocks may form a substantially solid feed mass and each block may weigh between about 2 and about 4 pounds, between about 2 and about 3 pounds, and preferably about 2.5 pounds. However, the blocks may be provided in various configurations that make the individual blocks easy to handle. For example, the size and weight of the block may be dependent on the desired consumption rate and the size of the animal. A block fed to a single weaned calf may be 10 pounds, while a block fed to a pen of 5 pigs may also be 10 pounds. In another example, the blocks may be sized and shaped so that a producer may pick up a feed block with one hand. In yet another example, the block may be sized and shaped to fit into an animal feeder. A pie piece-shaped block may fit in corner feeders, which may reduce access to the block to only one side.

The composition of the blocks may include a mixture of nutrients including carbohydrates, protein, fat and fiber and a wheat-based binder. The nutrients provided in the blocks may be formed as a mixture of feed components including, but not limited to, one or more of dehulled soybean meal; corn (e.g., fine ground corn); distillers grains; fat (e.g., grease); poultry meal; macronutrients (e.g., calcium carbonate, mono-dicalcium phosphate); micronutrients; vitamins (e.g., vitamin A, C, E); and trace minerals (e.g., zinc). In some implementations, a mixture of corn, soybean meal and distillers grains may account for between about 40 and about 80 percent of the total weight of the semi-solid animal feed block.

In some implementations, a nutrient profile to the semi-solid animal feed blocks may contain dry matter from about 70 to about 90 percent, from about 75 to about 90 percent, or about 90 percent based on a total weight of the feed block. Fat may be present from amount 5 to 10 percent or at about 7 percent of the total weight of the feed block. Crude protein may be present from about 15 to 25 percent, about 17 to about 21 percent, or about 21 percent of the total weight of the feed block.

In further implementations, the nutrient mixture may be tailored to meet specific dietary or growth-promoting needs of the animal receiving the feed block. For example, the composition of the nutrient mixture may be a gut-developing formula for promoting development of a young animal's digestive system and may include a mixture of grains such as corn, soybean meal and distillers grains, animal proteins, nutraceuticals. In this example, the young animal may include a piglet or a calf. In another example, the composition may be tailored for a distressed animal in confinement. In this example, the nutrient composition may include one or more of electrolytes and easily-digestible nutrients including simple proteins (e.g., base amino acids, soy protein, corn protein, cottonseed meal), simple carbohydrates, nutraceuticals, micro-minerals (e.g. zinc, Cu). Here, the animal in distress may be a sick animal or a pregnant animal preparing to give birth. In yet another example, the nutrient composition may be tailored for feeding to animals during transportation, such as weaned and feeder (approx. 50-60 lbs) pigs, which may be transported long distances over the course of about 14 to 20 hours.

The liquid binder composition provided in the block may include a mixture of binding components including, but not limited to, water, wheat flour and fructose. Although wheat flour is preferred for use in the liquid binder, other varieties of seed flour are within the scope of the present disclosure. Fructose may be in dry or liquid (e.g., syrup) form and may include, but is not limited to: corn syrup; high fructose corn syrup; agave nectar; honey; molasses; maple syrup; and fruit juices. When provided in liquid form, the fructose may contain about 30 percent moisture. In addition, other sugars such as glucose and sucrose may be used alone or in combination with the fructose. For example, high fructose corn syrup may be used in the binder composition and is a combination of glucose and fructose. In some implementations, wheat flour may account for about 3 to about 5 percent of the total weight of the semi-solid animal feed block and the sugar or sugars may account for about 15 to about 22 weight percent of the total weight of the semi-solid animal feed block, with about 30 weight percent of the sugar or sugars formed of moisture, which contributes from about 4.5 to about 6.6 percent moisture to the total weight of the block. However, the moisture content in the sugar or sugars, and therefore the total contribution of moisture to the weight of the block, may vary and may contribute up to about 10 weight percent of the block. It has been discovered that a binder composition of wheat flour and sugar provides a cohesive, paste-like binder composition that facilitates binding the dry ingredients within the finished block. Proteins from the wheat flour advantageously facilitate binding and provide plasticity that adds flexibility to the binder composition. Once heated, the proteins denature in the binder and become more rigid upon cooling. With increasing heat, the proteins denature further and the finished product increases in rigidity. Wheat flour used in combination with sugar advantageously results in the chain structure of the sugar becoming rigid subsequent to heating.

Moisture may account for between about 12 and about 17 weight percent of the total weight of the block, and more preferably between about 12 and about 14 weight percent. Accordingly, the semi-solid animal feed block may be a low moisture feed block, but generally contains a higher moisture content compared to dry, pelleted, crumbles or meal animal feeds that typically contain about 10 to about 12 percent moisture. Accordingly, the semi-solid animal feed blocks may have a moist, chewy and flexible consistency.

Methods of Making the Semi-Solid Animal Feed Blocks:

The semi-solid animal feed blocks may be produced according to the method 200 of FIG. 2. According to FIG. 2, the method 200 includes heating 210 a liquid binder composition of wheat flour, water and sugar to a protein denaturing temperature of at least about 240° F. At this temperature, the sugar is caused to bind in a semi-solid state. In some implementations, the composition may be heated up to between about 245° F. and about 250° F. to denature a portion of the proteins in the flour and the carbohydrates in the sugar to provide a relatively soft feed block. Relatively harder or firmer blocks may be formed by heating the liquid binder composition to elevated temperatures of about 250° F. to about 300° F. In further implementations, the binder may be heated up to over 300° F. To raise the temperature above boiling temperatures, the binder composition may be heated under pressure. The binder is typically heated to the desired temperature for at least 1 minute. Suitable cookers for heating the binder composition may include, but is not limited to a Walker Processor-Kettle. Particularly, those in the art will appreciate that other cooking systems, whether batch or continuous, that achieve the temperature and time requirements may be used.

In a separate vessel, a dry premix may be mixed 220 to form a homogenous mixture of nutritional components including at least one animal feed component, described above, which may include substantially intact proteins and other added energy sources (e.g., carbohydrates and fats), vitamins and macro and trace minerals. In some implementations, the premix may be mixed 220 concurrently as the liquid binder composition is heated 210.

The liquid binder mixture containing denatured proteins and heated carbohydrates and the dry premix is then blended 230 and worked so that the blended mixture has a consistency of a plastic, firm dough. The heated binder composition may be added to the dry premix in the heated state in order to prevent setting of the binder composition before mixing with the dry ingredients. Blending may be through the use of an in-line mixer and may include, but is not limited to, a Readco Continuous Processor with a twin screw or blending may take place in a batch system capable of uniformly blending the two premixes. Those skilled in the art will appreciate that other in-line mixers, such as twin shaft, co-rotating mixers adapted to continuously mix one or more dry compositions with the liquid binder composition may be used to produce a homogeneous, blended product. However, it is within the scope of the present disclosure to blend the mixture in batches.

The blended mixture is then pressed 240 into a mold of a desired feed block shape. The mold helps form and maintain the shape of the blended mixture during cooling. In some implementations, the feed block shape may be cylindrical (FIG. 1A) or brick-like (FIG. 1B), but many different shapes and sizes are suitable for providing to the animal. By pressing the mixture into the mold, the pressure exerted on the mixture helps to set the final shape of the product so it can be removed from the mold and still hold its shape while cooling.

The molded feed block may be cooled 250, such as through natural cooling at ambient temperatures, during which time the denatured protein in the binder composition binds the composition of the dry premix to form a semi-solid animal feed block. The molded feed block product may be a semi-solid composition with some plasticity and flexibility. The composition formed with a binder heated at elevated temperatures (e.g., exceeding 250° F.) may result in a molded feed block product with a semi-solid composition with relatively more rigidity compared to products produced by heating the binder at relatively lower temperatures. In addition, the denatured wheat flour protein in combination with sugar (e.g., high fructose corn syrup) results in the structure of the sugar within the binder composition becoming rigid upon cooling, resulting in a hard texture.

The cooled, molded semi-solid animal feed block product may be packaged 260 using conventional packaging systems.

Using the Semi-Solid Animal Feed Block:

The semi-solid animal feed block product may be fed as a feed supplement or a complete feed to livestock animals.

For example, the feed blocks may be provided to young animals, such as piglets that are still with the sow or calves in pens. However, the product may be used generally to feed young animals that have been recently weaned. The feed blocks may include nutrients that may promote gut development. The semi-soft nature of the feed blocks may additionally facilitate ingestion of solid food for young animals with undeveloped mouth strength and may promote chewing.

In another implementation the semi-solid animal feed block product may be fed to adult animals where added consumption is desired. For example, the animal may be a distressed animal and the nutrients may include electrolytes to fight dehydration and simple proteins and sugars for ease of digestion. In addition, the increased moisture content of the feed blocks compared to pelleted or meal feed may help to add moisture to the distressed animal's diet. The semi-soft nature of the feed blocks may be appealing to the distressed animal, particularly for a pregnant animal preparing to give birth. In another example, the semi-solid animal feed block may be provided to the animal during transport. In yet another example, harder feed blocks may be fed to swine in a group housing system. The product may be formed as a relatively harder feed block when fed to adult animals, in the manner discussed above. In this example, with a lower daily intake, the product lasts several days and may serve two purposes for the animals. First it is a way to feed the animals that are less aggressive that may otherwise have limited access to feed in the group pen. Second, it serves as a source of enrichment for the animals to occupy their time.

When the semi-solid animal feed block product is fed to animals, the semi-solid consistency of the blocks may promote consumption of solid feed. This may be due, in part, to the semi-solid blocks retaining their texture during consumption.

In addition, the blocks may remain in the animal's vicinity prior to consumption for more time compared to wetted meal, which may begin to spoil shortly after being hydrated. This may result in the blocks generating less waste during feeding and may be less expensive for the producer.

Swine Example

This experiment was conducted to evaluate the effects of feeding a semi-solid animal feed block nutritional supplement during days 21 to 36 post-weaning on growth performance of nursery pigs. There are currently no block products on the market for young pigs, and the semi-solid blocks were studied for their potential as a delivery system of solid feed for recently weaned pigs in the nursery. However, the system may also be used for feeding older animals as well.

Procedures:

237 weanling pigs (EBX Ultra×GPK 35) averaging 15.6 lb BW were used in a 36-day growth trial to evaluate the effect of semi-solid block supplementation on performance of nursery pigs. At weaning, pigs were sorted by weight and divided into sixteen weight groups (blocks). Pigs within each weight block were allotted into subgroups (pens) of four or five pigs per pen (16 pens/treatment). Dietary treatments were randomly assigned to pens (subgroups) within each of the weight groups (blocks). Treatments included: 1) Control 1 fed a pellet diet, 2) Control 2 fed as Control 1 plus a soft supplement fed during day 0 to 7 post-weaning, and 3) as Control 2 but with the semi-solid animal feed block group fed during day 21 to 36 post-weaning as Control 2 plus the semi-solid animal feed block. For treatments 2 and 3, soft supplements were provided day 0 to 7 post-weaning as described in table 1 below. In treatment 3, the semi-solid animal feed blocks were fed during day 21 to 36 post-weaning.

TABLE 1

| | Treatment | | |
|---|---|---|---|
| | 1 | 2 | 3 |
| | | Description | |
| | Control 1 | Control 2 | Semi-Solid Animal Feed Block |
| Day 0-4 (10/7-10/11) | Pellet 1 | Pellet 1 + Soft Supplement | Pellet 1 + Soft Supplement |
| Day 4-7 (10/11-10/14) | Pellet 1 | Pellet 1 + Soft supplement | Pellet 1 + Soft supplement |
| Day 7-21 (10/14-10/28) | Pellet 2 | Pellet 2 | Pellet 2 |
| Day 21-36 (10/14-10/28) | Pellet 3 | Pellet 3 | Pellet 3 + Semi-Solid Animal Feed Block |

The Ingredient composition of the semi-solid animal feed blocks included a dry matter content of about 90 percent, a fat content of about 7 percent, and a crude protein content of about 21 percent, and were formed according to method 200. Pelleted diets (Pellet 1-3) were medicated with ASP 250 (0.5%). Feed, including the pellets, soft supplement and semi-solid animal feed blocks, and water were offered ad libitum. For treatments 2 and 3, the soft supplements were fed in large creep feeders from day 0 to 7 post-weaning. For treatment 3, the semi-solid animal feed blocks were attached to each pen floor in treatment 3 with a white snap down pole placed in a hole in the center of the blocks; from day 21 to 36 post-weaning. For the first week of the trial, the nursery was maintained at 85° F. and decreased 3° F. per week. Pigs were offered Denagard (antibiotic) in the water for the first week. Pig body weight and feed intake were determined at day 0, 4, 7, 21, 27 and 36 post weaning. Average daily gain (ADG), average daily feed intake (ADFI), and feed to gain (feed:gain) ratio were evaluated.

Results:

Table 2 shows the effects of supplementing soft supplement and semi-solid animal feed blocks on growth performance of young pigs[a].

TABLE 2

| | Treatment | | | |
|---|---|---|---|---|
| | 1 Control 1 | 2 Control 2 | 3 Semi-Solid Animal Feed Block | SEM |
| No. of Pigs | 79 | 79 | 79 | |
| No. Rem & Mort | 1 | 0 | 0 | |
| Day 0 to 7 | | | | |
| ADG, lb | 0.35[c] | 0.32[c] | 0.37[cd] | 0.02 |
| ADFI[b], lb | 0.42[c] | 0.80[ed] | 0.80[ed] | 0.02 |
| Soft block as is | 0 | 0.60 | 0.60 | |
| Pellet | 0.42 | 0.31 | 0.31 | |
| Day 7 to 21 | | | | |
| ADG, lb | 1.17 | 1.21 | 1.17 | 0.03 |
| ADFI, lb | 1.31 | 1.33 | 1.30 | 0.03 |
| Feed: gain | 1.12 | 1.11 | 1.11 | 0.01 |
| Day 21 to 36 | | | | |
| ADG, lb | 1.80 | 1.82 | 1.80 | 0.03 |
| ADFI[b], lb | 2.51[c] | 2.50[c] | 2.75[d] | 0.06 |
| Blk intake as is, lb | 0 | 0 | 0.70 | |
| Feed: gain | 1.39[c] | 1.37[c] | 1.53[d] | 0.03 |
| Day 0 to 36 | | | | |
| ADG, lb | 1.27 | 1.29 | 1.28 | 0.02 |
| ADFI[b], lb | 1.64[c] | 1.74[d] | 1.83[e] | 0.03 |
| Feed: gain | 1.28[c] | 1.34[d] | 1.43[e] | 0.02 |
| Pig Weight, lb | | | | |
| Initial | 15.6 | 15.6 | 15.6 | 0.01 |
| Day 7 | 18.0[c] | 17.9[c] | 18.2[cd] | 0.15 |
| Day 21 | 34.5 | 34.7 | 34.6 | 0.46 |
| Day 36 | 61.5 | 62.1 | 61.5 | 0.68 |

[a]Values are means of 16 pens of 4 or 5 pigs each
[b]Pelleted feed plus soft supplement (corrected to 90% DM), or pelleted feed plus semi-solid animal feed. The soft blocks and semi-solid blocks (as is) were about 75% and 90% DM, respectively.
[cde]Means in the same row with different superscript differ (P < 0.05)

During days 7 to 21, when all pigs were fed a common diet, no significant (P>0.1) differences were observed in growth performance among treatment groups. During days 21 to 36, pigs receiving the semi-solid animal feed blocks had greater (P<0.05) ADFI and feed:gain ratio than those previously fed the control 1 or control 2 diets. During the overall experimental period (days 0 to 36), ADFI and feed:gain were greater (P<0.05) when pigs were fed treatment 2 (the soft supplement) or treatment 3 (soft supplement plus the semi-solid animal feed blocks) compared to those fed treatment 1. Pigs receiving treatment 3, e.g., the soft supplement during days 0 to 7 and the semi-solid animal feed blocks during days 21 to 36, had greater ADFI and feed:gain than those fed in treatment 2, e.g. the soft supplement only.

Although pigs fed in treatments 2 and 3 had similar gains to those fed the control diet in treatment 2, the soft supplements and the semi-solid animal feed blocks had good palatability and may also offer some behavioral benefits. The reduction in feed efficiency observed in pigs fed the supplements may have been associated with some unavoidable feed spillage from the creep feeders or detachment of the semi-solid animal feed blocks from the poles.

While the present disclosure provides various ranges, it will be understood that values, such as numeric integer values, at or within these ranges, or various ranges within the disclosed ranges, or ranges beginning or ending at a range value and beginning or ending at a value within the disclosed ranges may be used in particular embodiments without departing from the invention.

Although the present disclosure provides references to preferred embodiments, persons skilled in the art will recognize that changes may be made in form and detail without departing from the spirit and scope of the invention.

What is claimed is:

1. A method of feeding a recently-weaned piglet beginning at about 21 days post-weaning, comprising:
providing a semi-solid animal feed block to the recently-weaned piglet for up to 14 days beginning at about 21 days post-weaning, said semi-solid animal feed block comprising a binder composition and a nutrient mixture, the binder composition formed of denatured wheat flour protein and sugar, and the nutrient mixture comprising at least one animal feed component, the denatured protein and the sugar binding the nutrient mixture to form the semi-solid animal feed block as a molded, single mass that holds its shape and includes between about 12 and about 17 weight percent moisture, the recently-weaned piglet ingesting the semi-solid animal feed block ad libitum and, in response, exhibiting increased feed consumption.

2. The method of claim 1, wherein the sugar in the binder composition comprises fructose.

3. The method of claim 1, wherein the nutrient mixture comprises nutrients to promote digestive tract development of the piglet.

4. The method of claim 1, wherein the nutrient mixture includes between about 70 and about 90 percent dry matter based on a total weight of the feed block.

5. The method of claim 4, wherein the nutrient mixture includes between about 15 and about 25 percent crude protein based on the total weight of the feed block.

6. The method of claim 1, the piglet ingesting the semi-solid animal feed block and feed pellets ad libitum, and in response, the piglet exhibits an increased average daily feed intake.

7. The method of claim 1, wherein the semi-solid animal feed block weighs between about 2 and about 4 pounds.

* * * * *